(12) United States Patent
Saund et al.

(10) Patent No.: US 8,616,975 B1
(45) Date of Patent: Dec. 31, 2013

(54) PROXIMITY BASED GAMES FOR MOBILE COMMUNICATION DEVICES

(75) Inventors: Saran Saund, Mountain View, CA (US); Paul A. Lambert, Mountain View, CA (US)

(73) Assignee: PICO Mobile Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/602,850

(22) Filed: Sep. 4, 2012

Related U.S. Application Data

(63) Continuation of application No. 11/542,393, filed on Oct. 3, 2006, now Pat. No. 8,257,177.

(60) Provisional application No. 60/723,308, filed on Oct. 4, 2005.

(51) Int. Cl.
*A63F 13/00* (2006.01)

(52) U.S. Cl.
USPC .................................. 463/40; 463/39; 463/41

(58) Field of Classification Search
USPC ............................................. 463/30, 41, 42
See application file for complete search history.

(56) References Cited

U.S. PATENT DOCUMENTS

| | | | |
|---|---|---|---|
| 5,738,583 A | 4/1998 | Comas et al. | |
| 6,272,120 B1 | 8/2001 | Alexander | |
| 6,287,200 B1 * | 9/2001 | Sharma | 463/40 |
| 6,600,726 B1 | 7/2003 | Nevo et al. | |
| 6,690,935 B1 | 2/2004 | Calot et al. | |
| 6,704,866 B1 | 3/2004 | Benayoun et al. | |
| 6,707,801 B2 | 3/2004 | Hsu | |
| 6,760,587 B2 | 7/2004 | Holtzman et al. | |
| 6,785,592 B1 | 8/2004 | Smith et al. | |
| 6,785,892 B1 | 8/2004 | Miller | |
| 6,788,675 B1 | 9/2004 | Yang | |
| 6,793,580 B2 | 9/2004 | Sinclair et al. | |
| 6,795,701 B1 | 9/2004 | Baker et al. | |
| 6,799,056 B2 | 9/2004 | Curley et al. | |
| 6,859,460 B1 | 2/2005 | Chen | |
| 6,879,574 B2 | 4/2005 | Naghian et al. | |
| 6,879,812 B2 | 4/2005 | Agrawal et al. | |
| 6,909,705 B1 | 6/2005 | Lee et al. | |
| 6,932,698 B2 | 8/2005 | Sprogis | |
| 6,973,580 B1 | 12/2005 | Carroll et al. | |
| 7,013,391 B2 | 3/2006 | Herle et al. | |

(Continued)

OTHER PUBLICATIONS

IEEE Standards Board.IEEE 802.11 Standard, 1999. 1999 Edition (R2003).

(Continued)

*Primary Examiner* — Paul A D'Agostino
*Assistant Examiner* — Ankit Doshi

(57) ABSTRACT

A first wireless device including a communication module and a processor. The communication module is configured to detect a wireless signal from a target device. The processor is configured to determine a radial proximity of the first wireless devices to the target device based on a strength of the wireless signal. The processor is configured to execute a program. The program allows a user of the first wireless device to play a game with a second wireless device executing the program. The program is configured to generate a pictorial representation of the game on the first wireless device and the second wireless device. The processor is configured to alter the pictorial representation of the game on the first wireless device and the second wireless device based on the radial proximity of the first wireless device to the target device.

18 Claims, 3 Drawing Sheets

(56) References Cited

U.S. PATENT DOCUMENTS

| | | |
|---|---|---|
| 7,072,323 B2 | 7/2006 | Roberts et al. |
| 7,073,129 B1 | 7/2006 | Robarts et al. |
| 7,085,257 B1 | 8/2006 | Karves et al. |
| 7,087,562 B2 | 8/2006 | Abe et al. |
| 7,097,562 B2 | 8/2006 | Gagner |
| 7,143,171 B2 | 11/2006 | Eriksson et al. |
| 7,181,544 B2 | 2/2007 | Vangal et al. |
| 7,224,964 B2 | 5/2007 | Souissi et al. |
| 7,236,772 B1 | 6/2007 | Botzas |
| 7,251,235 B2 | 7/2007 | Wentink |
| 7,308,263 B2 | 12/2007 | Gallagher et al. |
| 7,324,444 B1 | 1/2008 | Liang et al. |
| 7,400,722 B2 | 7/2008 | Qi et al. |
| 7,435,179 B1 | 10/2008 | Ford |
| 7,440,430 B1 | 10/2008 | Jagadeesan et al. |
| 7,452,278 B2 | 11/2008 | Chen et al. |
| 7,970,384 B1 | 6/2011 | Lambert et al. |
| 8,374,584 B1 | 2/2013 | Lambert et al. |
| 2002/0151366 A1 | 10/2002 | Walker et al. |
| 2002/0152388 A1 | 10/2002 | Linnartz et al. |
| 2002/0191560 A1 | 12/2002 | Chen et al. |
| 2002/0199124 A1 | 12/2002 | Adkisson |
| 2003/0069018 A1 | 4/2003 | Matta et al. |
| 2003/0182454 A1 | 9/2003 | Huth et al. |
| 2003/0224855 A1* | 12/2003 | Cunningham ............ 463/41 |
| 2003/0231189 A1 | 12/2003 | Williams |
| 2003/0231625 A1 | 12/2003 | Calvignac et al. |
| 2004/0066751 A1 | 4/2004 | Tseng et al. |
| 2004/0082383 A1 | 4/2004 | Mancaster et al. |
| 2004/0105415 A1 | 6/2004 | Fujiwara et al. |
| 2004/0127277 A1 | 7/2004 | Walker et al. |
| 2004/0174829 A1 | 9/2004 | Ayyagari |
| 2004/0185851 A1 | 9/2004 | Nagai |
| 2004/0196808 A1 | 10/2004 | Chaskar et al. |
| 2004/0236850 A1* | 11/2004 | Krumm et al. ............ 709/224 |
| 2005/0025163 A1 | 2/2005 | Christie |
| 2005/0032577 A1 | 2/2005 | Blackburn et al. |
| 2005/0041660 A1 | 2/2005 | Pennec et al. |
| 2005/0041793 A1 | 2/2005 | Fulton et al. |
| 2005/0041796 A1 | 2/2005 | Joseph et al. |
| 2005/0073980 A1 | 4/2005 | Thomson et al. |
| 2005/0079873 A1 | 4/2005 | Caspi et al. |
| 2005/0099977 A1 | 5/2005 | Williams et al. |
| 2005/0157661 A1 | 7/2005 | Cho |
| 2005/0177369 A1 | 8/2005 | Stoimenov et al. |
| 2005/0177639 A1 | 8/2005 | Reunamaki et al. |
| 2005/0181872 A1 | 8/2005 | Acharya et al. |
| 2005/0197189 A1 | 9/2005 | Schultz |
| 2005/0250487 A1 | 11/2005 | Miwa et al. |
| 2005/0250497 A1 | 11/2005 | Ghosh et al. |
| 2005/0268003 A1 | 12/2005 | Wang et al. |
| 2005/0286456 A1 | 12/2005 | McNew et al. |
| 2006/0041750 A1 | 2/2006 | Carter et al. |
| 2006/0045138 A1 | 3/2006 | Black et al. |
| 2006/0046709 A1 | 3/2006 | Krumm et al. |
| 2006/0063539 A1 | 3/2006 | Beyer |
| 2006/0135262 A1 | 6/2006 | Kennedy et al. |
| 2006/0166740 A1 | 7/2006 | Sufuentes |
| 2006/0172736 A1 | 8/2006 | Nevo |
| 2006/0205409 A1 | 9/2006 | Chiou et al. |
| 2006/0221857 A1 | 10/2006 | Bushnell et al. |
| 2006/0268711 A1 | 11/2006 | Doradla et al. |
| 2007/0026866 A1 | 2/2007 | Krishnamurthi et al. |
| 2007/0035513 A1 | 2/2007 | Sherrard et al. |
| 2007/0047547 A1 | 3/2007 | Conner et al. |
| 2007/0047697 A1 | 3/2007 | Drewry et al. |
| 2007/0060355 A1 | 3/2007 | Amaitis et al. |
| 2007/0060358 A1 | 3/2007 | Amaitis et al. |
| 2007/0076683 A1 | 4/2007 | Chung |
| 2007/0082671 A1 | 4/2007 | Feng et al. |
| 2007/0086394 A1 | 4/2007 | Yamada et al. |
| 2007/0099703 A1 | 5/2007 | Terebilo |
| 2007/0197237 A1 | 8/2007 | Powell et al. |
| 2007/0202910 A1 | 8/2007 | Brewer et al. |
| 2008/0039015 A1 | 2/2008 | Nakata et al. |
| 2008/0069105 A1 | 3/2008 | Costa et al. |
| 2008/0082671 A1 | 4/2008 | Meijer et al. |
| 2008/0095112 A1 | 4/2008 | Wiemann et al. |
| 2008/0123608 A1 | 5/2008 | Edge et al. |
| 2008/0228547 A1 | 9/2008 | Doss et al. |
| 2009/0191878 A1 | 7/2009 | Hedqvist et al. |
| 2009/0222358 A1 | 9/2009 | Bednarek |
| 2010/0093374 A1 | 4/2010 | Dacosta |
| 2010/0285776 A1 | 11/2010 | De Froment |
| 2011/0066485 A1 | 3/2011 | Rissanen |
| 2011/0093876 A1 | 4/2011 | Belz et al. |
| 2012/0095844 A1 | 4/2012 | Barnes, Jr. |
| 2012/0106728 A1 | 5/2012 | Ghaffari et al. |
| 2013/0096966 A1 | 4/2013 | Barnes, Jr. |

OTHER PUBLICATIONS

Newton, Harry. Newton's Telecom Dictionary. 15th Edition. Miller Freeman Inc., 1999. 762. (3 pages).

"Universal Mobile Access: UMA Expands Beyond Dual-Mode Handsets"; The UMA Company; Jan. 2007; 8 pages.

Meredith, John; "Voice Call Continuity in 3GPP"; CompactPCI and Advanced TCA Systems; Apr. 2006; 2 pages.

* cited by examiner

PROXIMITY BASED GAMES FOR MOBILE COMMUNICATION DEVICES

CROSS-REFERENCE TO RELATED APPLICATIONS

This application is a continuation of U.S. patent application Ser. No. 11/542,393 filed Oct. 3, 2006, which claims priority to U.S. Provisional Application No. 60/723,308, filed Oct. 4, 2005. The entire disclosures of the above applications are incorporated herein by reference.

FIELD

The present invention relates to wireless networks. More particularly, the present invention relates to game based communications between wireless devices within point to point communication of each other.

BACKGROUND

Interactive gaming has become ubiquitous among digital communication devices. The reduction in size and cost of wireless communications devices, as well as reduction in cost of processors and memory, have enabled mobile wireless devices to exceed the capabilities of large computers of years past. It is well known that wireless devices such as telephones, email devices, and PDA's have been enabled for wireless communication with Internet protocol backbone networks by way of protocols such as the several forms of IEEE 802.11.

Other local wireless protocols are in widespread use. Bluetooth-enabled devices communicate to determine whether they may share data or whether one needs to control the other. The connection and communication process is performed automatically. Once a conversation between the devices has occurred, the devices form a network. Such automatic connection and communication systems create a Personal-Area Networks (PAN). Other wireless standards that may be used include IRDA, hiperlan/2, and HomeRF. When a PAN is established, such as between one VoIP or Bluetooth mobile phone and another, the members of the PAN can communicate directly. The more generally preferred mode of operation for such a mobile telephone is connection to a local access point, whereby the user can contact any source available to the Internet for conversation or gaming.

In a local area network communication, the access point transmits information separately to each local wireless device. An advantage to using a point-to-point communication is that different information (e.g., customization) may be sent to each wireless device. Even if the same information is being sent to several recipients (e.g., ensuring uniformity of a game's state for all local users coordinated by a remote server), however, in a point-to-point communication with multiple recipients, the information is transmitted redundantly to each recipient. However, an access point, comprising a wireless communication module and access point server which connects to an IP network, game state information may be transmitted, daisy chain, along point-to-point communications from an access point within range of only one wireless device, thereby extending the effective communication range of the access point.

The addition of 802.11 Wireless LAN (WLAN) capability to wireless devices enabled mobility. Interactive games where several players interact based on a physical location have been described in U.S. Pat. No. 6,932,698. That patent describes a system requiring the sophisticated hardware and software of a GPS locator, which necessarily reduces the size and increases the cost of a game playing wireless device.

Some mobile wireless devices are capable of sensing signal strength of a wireless communication target. The IEEE 802.11 standard defines a mechanism for measurement of RF energy by a wireless NIC. This numeric value is an integer with an allowable range of 0-255 (a 1-byte value) called the Receive Signal Strength Indicator (RSSI). RSSI is an arbitrary integer value, defined in the 802.11 standard and intended for use, internally, by the microcode on the adapter and by the device driver. For example, when an adapter wants to transmit a packet, it must be able to detect whether or not the channel is clear (i.e., nobody else is transmitting). When a 802.11 wireless device is in communication with an access point and is roaming, there comes a point when the signal level received from the access point drops to a somewhat low value (because the device is moving away from the access point). This level is called the "Roaming Threshold" and some intermediate (but low) RSSI value is associated with it. Such information is sensed and stored for use by a device control program for the wireless device. It is thus well known to provide a wireless device with information concerning receiving signal strength of another wireless device, an access point, or some other intended source of wireless signals.

There is a need for a first mobile wireless device enabled for game play to detect and use the inference of proximity to a second wireless device, access point or other source (target source) by way of receiving signal strength (or its equivalent) from the source as an integral element of game play for a game.

SUMMARY

The present invention integrates the inference of a first mobile wireless device proximity to a second wireless device, access point, or other source (target source) by way of receiving, measuring and storing signal strength (or its equivalent) from the source as an integral element of game play for a game. The proximity of one wireless device is close to a target source provides the ability to create new and interesting interactive games that can take advantage of the communication and network capabilities of mobile wireless devices.

The first wireless device is adapted to detect wireless signal strength from a target source, store that information and compare it to a range signal strengths which are well known for a particular wireless network. For instance, a well known wireless network operates at a full signal strength output of 100 milliwatts, whose signal strength rapidly drops off with in a known rate with unimpeded distance. Some correction of distance of a first wireless device and a target source may be made for obstacles such as walls or local bandwidth interference.

In any event, the first wireless device is capable of calculating an approximate radial distance from a target source, even if signal strength from the target source drops below acceptable levels for bi-directional communication. While the first wireless device may roam or switch to another wireless device for communication with a PAN or LAN, the first wireless device can continue to measure signal strength from the target source for calculation of approximate radial distance from the target source.

In the present invention, radial distance of a first wireless device from the target source under 802.11 mobile wireless devices becomes an element of interactive or solo games played through the user interface of the first wireless device.

The mobile wireless devices of the present invention comprise a processor connected via an input/output unit with a user interface and a wireless communication module. The user interface comprises at least those devices to required to participate interactively with game functions and game data of a game. The game functions (such as causing the game to initiate, progress and terminate) and game data (such as video and audio content) operate so that at any given time the game is at a game state. The storage of game functions and game data may be distributed in the invention system among the wireless devices, game servers directly connected with an IP network, and target sources.

For instance, all game functions and game data may be stored on a first mobile wireless device, whereby the device control program determines the game state. A wireless device may play a solo game integrating proximity to a target source. Alternately, a first wireless device may form a PAN with a second wireless device, where the proximity of the first and/or second wireless device from the target source is an element of game play.

In another form, the game functions and game data may be stored on a game server, whereby wireless devices communication with the server for transmission of game data (such as by streaming communication protocol) and game state to the wireless devices according to their progress and identity to the overall game. Users of the wireless devices at appropriate times provide input from their user interfaces, which is transmitted to the game server for interactive game play.

In another form, game data may be stored on each wireless device and game functions are stored on the game server. Communications between the wireless devices and the game server may be limited to game state control of the play of the game.

An object of the invention is the use of proximity of one or more wireless devices to a target source as an element of game play in a local network. The progress, rules and functions of virtually any game may be adapted to or already incorporate the physical distance of a player to another player, a goal, or point of avoidance, all of which may be target sources in the invention system.

Games can be created or adapted that require the user to move in physical space relative to the target source. Signal strength increase, decrease or lack of change infers relative change in distance of a first wireless device without further calculation of actual distance. Alternately, apparent actual distance may be calculated based on comparison of current signal strength with full signal strength, with some correction optionally for obstacles and noise.

In addition, the user interface and device control program optionally comprise means for exchange of voice and data communications during game play. Rules, i.e., game functions may be communicated and/or modified on the basis of data communications between players. As is common among interactive gaming, information indicating rewards and prizes to specific players may be transmitted among the player or players.

Data and voice communications could be encrypted. Anonymity of non-group members could be an optional service.

Examples of these games or game functions for existing games include:
  Fox hunt type games where a user travels over an area locating a target using a signal on device.
  A fox hunt type game where the goal is another mobile user.
  A friend finder game that would alert a user when a wireless devices (WLAN) was identified within radio range.
  Product shopping games where coupons or monetary rewards were given for following specific rules based on proximity and clicks.
  Camera oriented games that require a user to take a picture of a specific object in a location. Picture with timestamp would be part of rules. Picture could be related to proximity found target.
  Games could only allow authenticated members to play.
  Games could encode broadcast membership information to provide anonymity.
  Mobile device could provide programmable proximity cues as part of game.

Target sources may be commercial stores or particular products within a store, where a user of a wireless device may play a hot-cold game to try to find the target source. The present invention may integrate specific monetary rewards such as vibration or sound alerts from the wireless device when in proximity of a specific service (coffee shop) or a store making a limited time offer of a product or discount.

When a wireless device has been moved to within a required distance of a target source, the user interface may be create by audio or pictoral output reward or assistance information such as maps, coupons, or menus.

It is a further object of the invention to provide an output to a display screen or to provide audio output so that a user of a wireless device will be informed of an approximate physical distance of the wireless device from the target source. This is of particular value in location of another person in a crowded situation, as is well known in the cities of New York and Tokyo.

DESCRIPTION

The invention is now discussed with reference to the figures.

Figure 1:
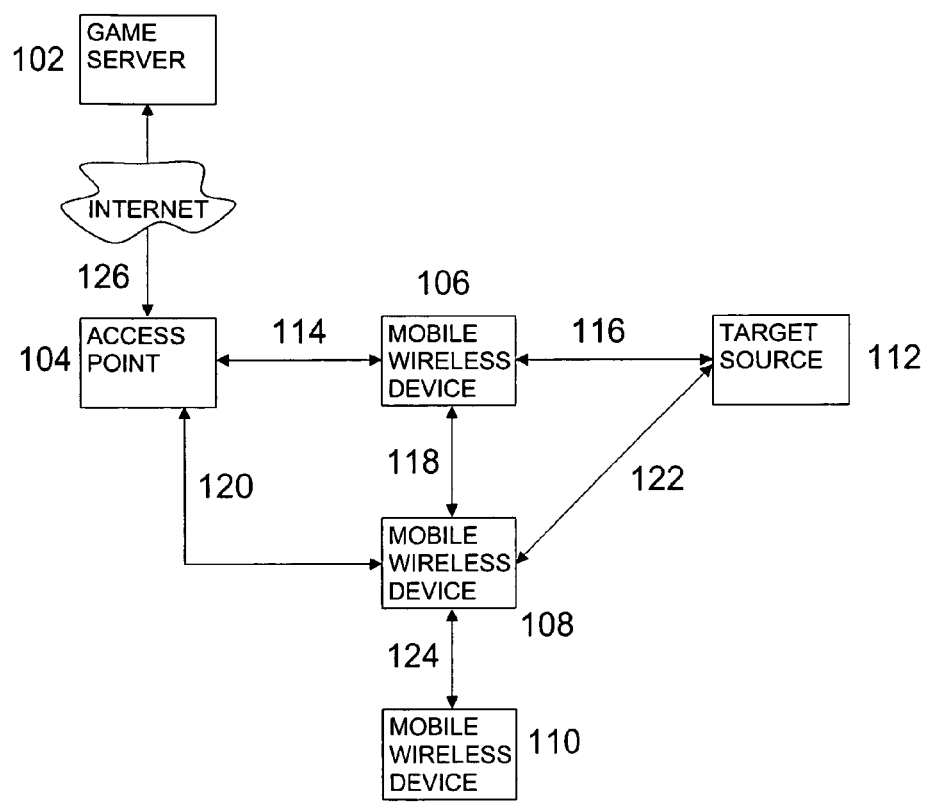
FIG. 1 is a block diagram of the proximity based invention system showing mobile wireless devices, a target source, an access point and a game server. operated by a mobile user, where said device is capable of roaming to other access points.

FIG. 1 shows mobile wireless devices 106, 108 and 110, each of which is enabled for wireless communication via Internet protocol such as IEEE 802.11 with each other and with access point 102 and target source 112. Access point 102 is connected via link 126 through the Internet with game server 102. Game server 102 stores a game program or a portion thereof, such as only game functions, while game data which establishes audio and/or pictoral output to a user interface of the wireless devices. In such a circumstance in which only game functions are stored at the game server 102, game data may be stored on each of the wireless devices so that game server 102 coordinates a uniform game state is maintained on each of the wireless devices.

Mobile wireless devices 106, 108 and 110 comprise a processor, wireless communication module and a user interface. The user interface comprises elements selected from the list of speaker, microphone, display screen, pressure sensitive buttons or switches, a touch sensitive screen incorporated in the display screen, and other such input and output devices as may be required for interactive game play with other wireless devices. A device control program on the wireless devices provides for means to establish a personal area network (point to point wireless communications) and/or a local area network (broadcast wireless communications) via the access point and remote conference servers (not shown). The target source may be another wireless device or may be a similarly equipped device enabled for communicating beacon signals to the wireless devices. The wireless devices comprise circuits and programming enabling the wireless devices to detect signal strength of the beacon signals and determine the approximate or relative distance from each wireless device from the target source. This determination of radial proximity is stored in the wireless device and/or transmitted to the game server or one or more of the wireless devices.

The determination of radial proximities are transmitted to the location of the operation of game functions, whereby the radial proximities may change the game state, i.e., a user who has moved closer to or farther from the target source will cause the game state to change so that they have advanced, receded, or otherwise affected their position in the game play. For instance, wireless device 106 may have displayed on its display screen an instruction that the user is allowed to move two steps. The user, upon moving the two steps has, without realizing the actual location of target source 112, moved closer to target 112. In doing so, the user may be awarded points in a game of "Simon Says" among the users of the wireless devices. In response, the game state of the game program changes and causes relative distances of the wireless devices from the target source 112 may be shown on the display screen in a pictoral representation.

Wireless device 106 is shown establishing wireless communication link 114 with access point 104, communications link 116 with target source 112, and communication link 118 with wireless device 108. Wireless device 108 is shown establishing wireless communication link 120 with access point 104, communications link 122 with target source 112, communication link 118 with wireless. device 106, and communication link 124 with wireless device 110. Wireless communication device 110 is outside of range of access point 104 and target source 112, so must receive all of its input regarding the relative distances of wireless devices 106 and 108 from target source 112 by way of point to point communication via link 124 with wireless device 108. Wireless device 108 is in point to point communication with wireless device 106 by link 118.

Figure 2:
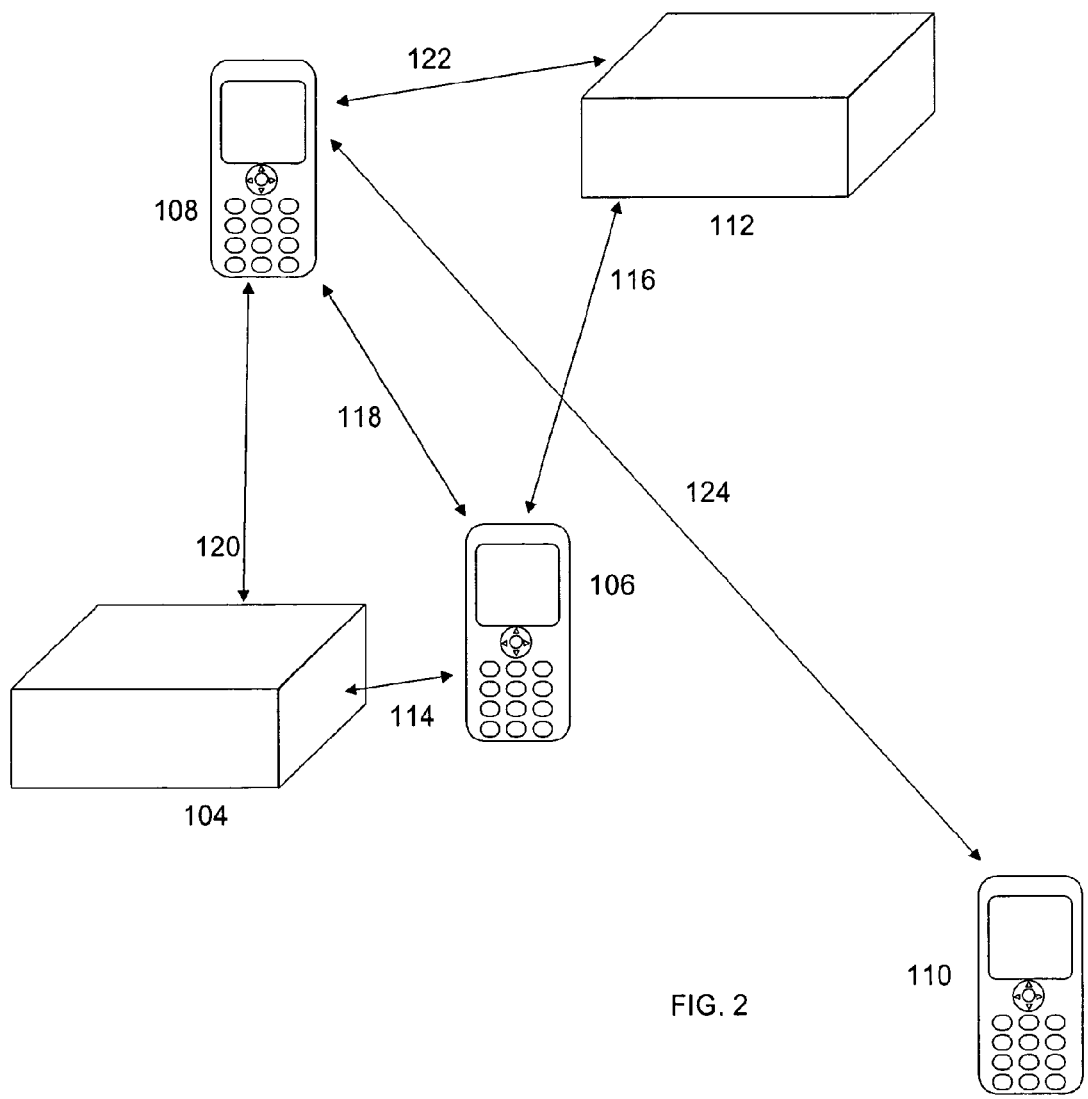
FIG. 2 is room sized embodiment of the invention system of FIG. 1.

FIG. 2 shows a room size example of the invention system. Assume that target source 112 is hidden or is otherwise in a location unknown to users of wireless devices 106, 108, and 110, which are shown as game enabled wireless phone having pressure sensitive buttons and a four way directional play device. Other such player input means are well known in game playing. Generally, the arrangement of the elements of FIG. 1 are repeated in FIG. 2 for the space of a room accommodating the movement of three users of wireless devices 106, 108, and 110.

Figure 3:
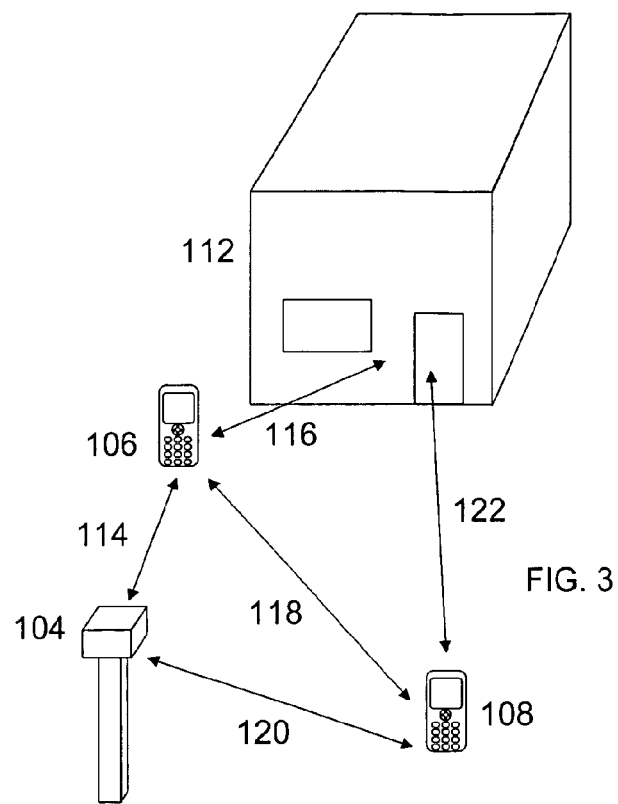
FIG. 3 is a city block sized embodiment of the invention system of FIG. 1.

Generally, the arrangement of the elements of FIG. 3 are repeated in FIG. 3 for the space of a room accommodating the movement of three users of wireless devices 106 and 108, where target source 112 may be within a building among others on a street, where the users of the wireless devices seek the building concealing the target source.

Figure 4:
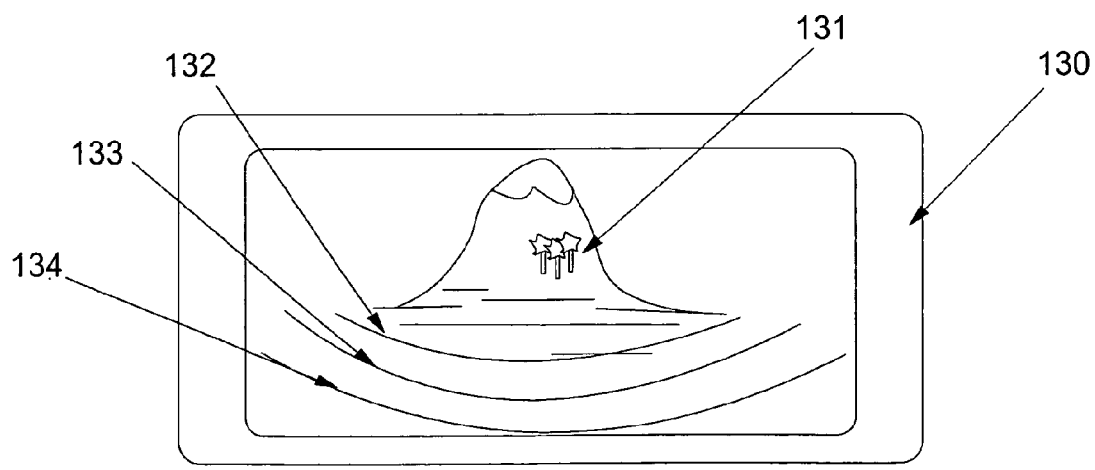
FIG. 4 is a pictoral representation of a display screen of a mobile wireless device of the invention system showing a game state of a game played with the invention system.

FIG. 4 represents a pictoral representation of a game state created by execution of the game functions of the game program for presentation of game data. Display screen 130 shows a group of trees on a mountain slope target 131, where outlying target 131 are successively distant progress lines 132, 133 and 134. Proximity based gaming relates each of the progress lines 132, 133 and 134 to physical advances of a user bearing a wireless device to a target source. As a user reduces radial distance between themselves and the target source, an indicator on screen 10 will show that a user is approaching target 131. At passing each of the progress lines 132, 133 and 134 on the way to the target source, a user will increase a point count or may lose points as a user moves away from the target source and crosses one of the previously passed progress lines. Many other such games and changes in game state will occur to one skilled in the art with the present disclosure.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

What is claimed is:

1. A first wireless device comprising:
   a communication module configured to detect a wireless signal from a target device; and
   a processor configured to:
      determine a radial proximity of the first wireless devices to the target device based on a strength of the wireless signal; and
      execute a program, wherein the program
         allows a user of the first wireless device to play a game with a second wireless device;
         generates a pictorial representation of the game on the first wireless device and the second wireless device according to data exchanged between the first wireless device and the second wireless device during the game; and
         alters the pictorial representation of the game on the first wireless device and the second wireless device based on (i) the data exchanged between the first wireless device and the second wireless device during the game, and (ii) the radial proximity of the first wireless device to the target device,
      wherein the processor is configured to calculate a distance of the first wireless device from the target device based on the strength of the wireless signal, and
      wherein the communication module is configured to transmit the distance to the second wireless device.

2. The first wireless device of claim 1, wherein the program is configured to determine a reward based on the radial proximity.

3. The first wireless device of claim 1, wherein the processor is configured to generate an alert in response to receiving a reward from the target device.

4. The first wireless device of claim 1, wherein the processor is configured to generate an alert in response to the first wireless devices being proximate to the target device.

5. The first wireless device of claim 1, wherein the processor is configured to generate an alert in response to identifying the second wireless device within a range of the first wireless device.

6. The first wireless device of claim 1, wherein:
   the pictorial representation includes a pictorial representation of functions and data associated with the game;
   the functions include functions to initiate, progress, and terminate the game; and
   the data include audio and video content of the game.

7. The first wireless device of claim 1, further comprising a user interface configured to output the pictorial representation.

8. The first wireless device of claim 1, wherein the communication module is configured to access the program stored on a server.

9. The first wireless device of claim 1, further comprising memory configured to store the program.

10. A method comprising:
    receiving, at a first wireless device, a wireless signal from a target device;
    determining a radial proximity of the first wireless devices to the target device based on a strength of the wireless signal;
    executing a program on the first wireless device and a second wireless device to allow a user of the first wireless device to play a game with the second wireless device;
    generating a pictorial representation of the game on the first wireless device and the second wireless device;
    altering the pictorial representation of the game on the first wireless device and the second wireless device based on the radial proximity of the first wireless device to the target device;
    calculating a distance of the first wireless device from the target device based on the strength of the wireless signal; and
    transmitting the distance to the second wireless device.

11. The method of claim 10, further comprising determining a reward based on the radial proximity.

12. The method of claim 10, further comprising generating an alert in response to receiving a reward from the target device.

13. The method of claim 10, further comprising generating an alert in response to the first wireless devices being proximate to the target device.

14. The method of claim 10, further comprising generating an alert in response to identifying the second wireless device within a range of the first wireless device.

15. The method of claim 10, wherein:
    the pictorial representation includes a pictorial representation of functions and data associated with the game;
    the functions include functions to initiate, progress, and terminate the game; and
    the data include audio and video content of the game.

16. The method of claim 10, further comprising outputting the pictorial representation on a user interface of the first wireless device.

17. The method of claim 10, further comprising accessing the program stored on a server.

18. The method of claim 10, further comprising storing the program on the first wireless device.

\* \* \* \* \*